(12) United States Patent
Van Giesen et al.

(10) Patent No.: US 11,594,999 B2
(45) Date of Patent: Feb. 28, 2023

(54) SOLAR ROOF FORMING ELEMENT, BUILDING, AND METHOD OF FORMING A ROOF

(71) Applicant: SABIC GLOBAL TECHNOLOGIES B.V., Bergen op Zoom (NL)

(72) Inventors: Roland Van Giesen, Geleen (NL); Henrica Norberta Alberta Maria Steenbakkers-Menting, Geleen (NL); Roeland Leonardus Hubertus Maria Verlaek, Geleen (NL); Petya Dochkova Yaneva, Geleen (NL); Robert Walter Venderbosch, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 140 days.

(21) Appl. No.: 17/252,816

(22) PCT Filed: Jul. 4, 2019

(86) PCT No.: PCT/EP2019/067963
§ 371 (c)(1),
(2) Date: Dec. 16, 2020

(87) PCT Pub. No.: WO2020/007967
PCT Pub. Date: Jan. 9, 2020

(65) Prior Publication Data
US 2021/0265938 A1    Aug. 26, 2021

(30) Foreign Application Priority Data

Jul. 4, 2018 (EP) .................................. 18181759

(51) Int. Cl.
*H02S 20/23* (2014.01)
*H02S 30/10* (2014.01)
*E04D 1/30* (2006.01)

(52) U.S. Cl.
CPC ................ *H02S 20/23* (2014.12); *E04D 1/30* (2013.01); *H02S 30/10* (2014.12)

(58) Field of Classification Search
CPC .................................. H02S 20/23; H02S 30/10
See application file for complete search history.

(56) References Cited

U.S. PATENT DOCUMENTS 807,787 A * 12/1905 Staples .................... E04B 9/068
                                                          52/461
5,164,020 A * 11/1992 Wagner ................... E04D 3/366
                                                          52/173.3

(Continued)

FOREIGN PATENT DOCUMENTS

EP          828036 A2 *  3/1998   ............. E04D 1/365
WO     2008134893 A1    11/2008

(Continued)

OTHER PUBLICATIONS

International Search Report for International Application No. PCT/EP2019/067963, International Filing Date Jul. 4, 2019, dated Sep. 4, 2019, 6 pages.

(Continued)

*Primary Examiner* — Golam Mowla
(74) *Attorney, Agent, or Firm* — Cantor Colburn LLP

(57) ABSTRACT

The present teachings relate to a solar roof forming element for forming a solar roof of a building, comprising an extruded, elongate polymer roof plate, element coupling means, at least one solar panel covering the roof plate, panel coupling means for coupling the solar panel to the roof plate, comprising a first coupling part at a first side of the roof plate and a second coupling part at a first side of the solar panel, said coupling parts configured such that they mutually couple as a result of a movement of the solar panel relative to the roof plate, wherein in a coupled state a movement of the solar panel away from the roof plate in a direction (Continued)

perpendicular to the roof plate is blocked. The present teachings further relate to a combination of such solar roof forming elements, to a building, and to a method of forming a roof.

16 Claims, 8 Drawing Sheets

(56) References Cited

U.S. PATENT DOCUMENTS

| | | | | |
|---|---|---|---|---|
| 5,232,518 A * | 8/1993 | Nath | ............... | E04D 3/3605 |
| | | | | 52/509 |
| 5,409,549 A * | 4/1995 | Mori | ............... | H02S 20/23 |
| | | | | 52/173.3 |
| 5,571,338 A * | 11/1996 | Kadonome | ............... | F24S 20/67 |
| | | | | 52/173.3 |
| 6,269,596 B1 * | 8/2001 | Ohtsuka | ............... | H02S 20/23 |
| | | | | 126/621 |
| 6,617,507 B2 * | 9/2003 | Mapes | ............... | F24S 25/50 |
| | | | | 126/621 |
| 6,959,517 B2 * | 11/2005 | Poddany | ............... | F24S 25/20 |
| | | | | 52/173.3 |
| 6,960,716 B2 * | 11/2005 | Matsumi | ............... | H02S 20/23 |
| | | | | 136/251 |
| 7,012,188 B2 * | 3/2006 | Erling | ............... | F24S 25/67 |
| | | | | 126/621 |
| 7,406,800 B2 * | 8/2008 | Cinnamon | ............... | F24S 25/67 |
| | | | | 52/173.3 |
| 7,434,362 B2 * | 10/2008 | Liebendorfer | ............... | F24S 25/636 |
| | | | | 52/173.3 |
| 7,814,899 B1 * | 10/2010 | Port | ............... | F24S 25/636 |
| | | | | 52/173.3 |
| 7,856,769 B2 * | 12/2010 | Plaisted | ............... | F24S 25/20 |
| | | | | 52/173.3 |
| 7,857,269 B2 * | 12/2010 | Plaisted | ............... | F24S 25/12 |
| | | | | 52/173.3 |
| 7,900,407 B2 * | 3/2011 | Plaisted | ............... | H02S 20/23 |
| | | | | 52/656.1 |
| 8,109,048 B2 * | 2/2012 | West | ............... | F24S 25/20 |
| | | | | 52/173.3 |
| 8,234,821 B2 * | 8/2012 | Plaisted | ............... | F24S 25/40 |
| | | | | 52/656.1 |
| 8,375,654 B1 * | 2/2013 | West | ............... | F24S 25/20 |
| | | | | 52/173.3 |
| 8,713,881 B2 * | 5/2014 | DuPont | ............... | F24S 25/30 |
| | | | | 52/173.3 |
| 8,806,813 B2 * | 8/2014 | Plaisted | ............... | H02S 20/23 |
| | | | | 52/173.3 |
| 8,938,932 B1 * | 1/2015 | Wentworth | ............... | F24S 25/61 |
| | | | | 52/173.3 |
| 9,147,785 B2 * | 9/2015 | Haddock | ............... | H01L 31/048 |
| 9,816,731 B2 * | 11/2017 | West | ............... | F24S 25/67 |
| 2001/0034982 A1 * | 11/2001 | Nagao | ............... | H02S 20/23 |
| | | | | 52/173.3 |

FOREIGN PATENT DOCUMENTS

| | | |
|---|---|---|
| WO | 2009141809 A2 | 11/2009 |
| WO | 2010128462 A2 | 11/2010 |
| WO | 2015132336 A1 | 9/2015 |

OTHER PUBLICATIONS

Written Opinion for International Application No. PCT/EP2019/067963, International Filing Date Jul. 4, 2019, dated Sep. 4, 2019, 10 pages.

* cited by examiner

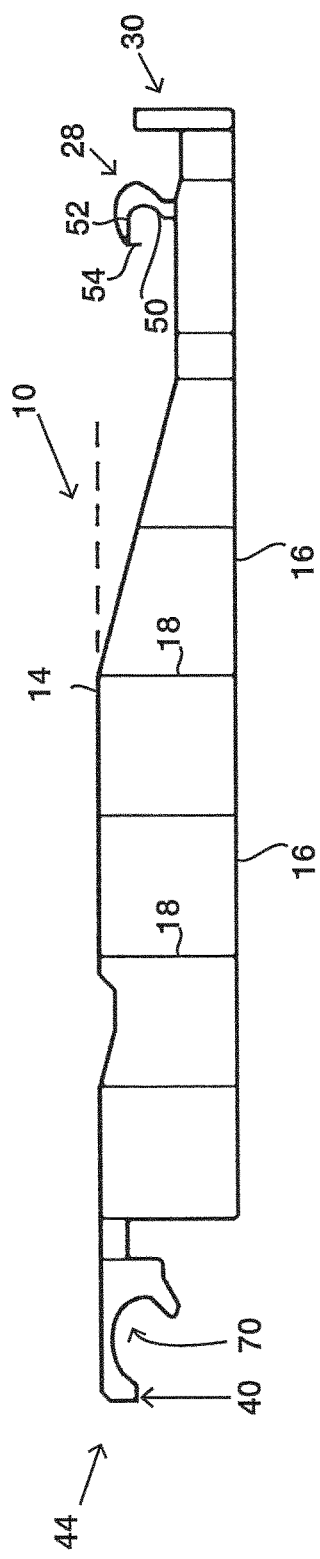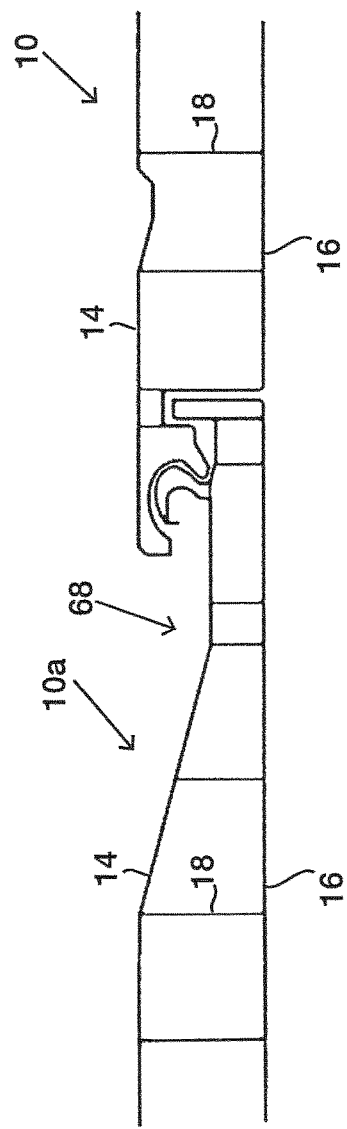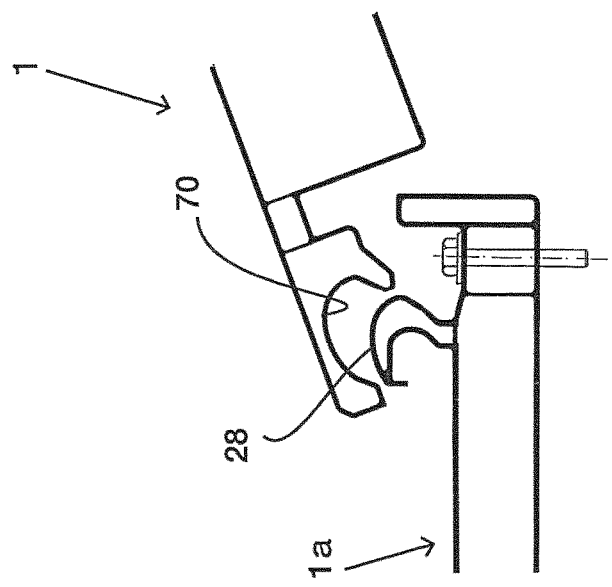

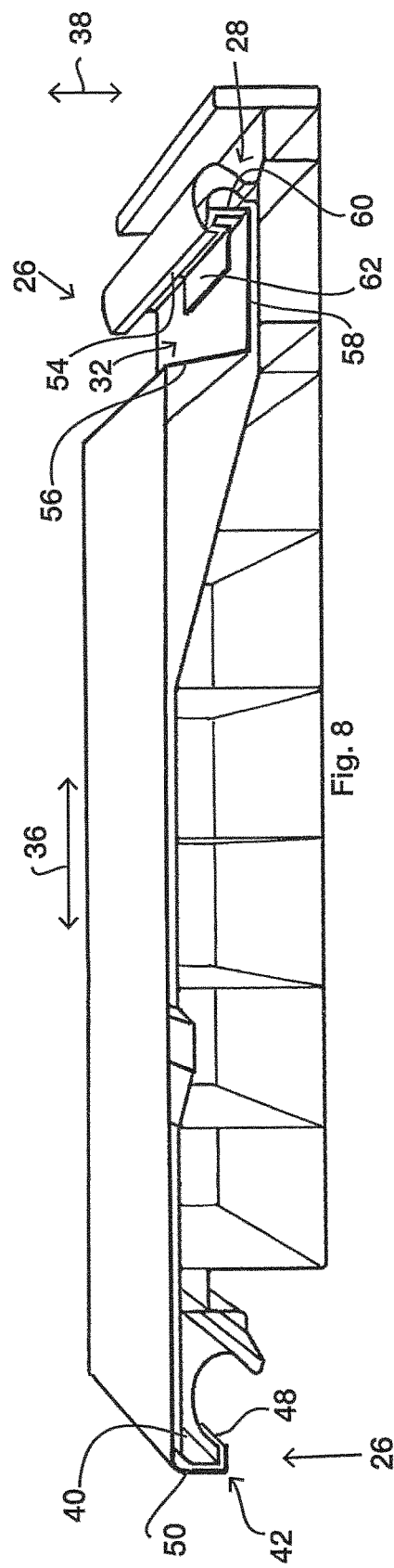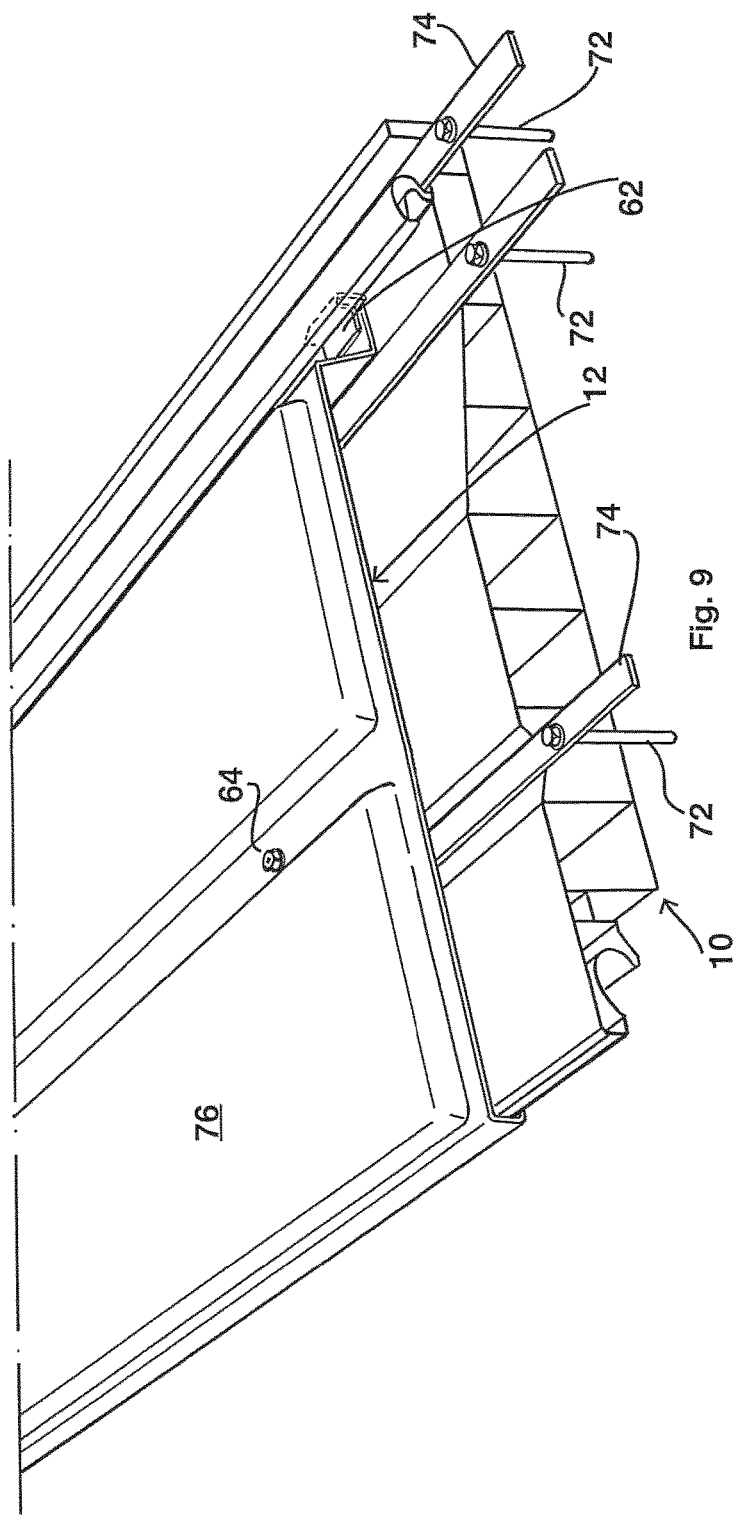

SOLAR ROOF FORMING ELEMENT, BUILDING, AND METHOD OF FORMING A ROOF

CROSS REFERENCE TO RELATED APPLICATIONS

This application is a National Stage application of PCT/EP2019/067963, filed Jul. 4, 2019, which claims the benefit of European Application No. 18181759.4, filed Jul. 4, 2018, both of which are incorporated by reference in their entirety herein.

TECHNICAL FIELD

The invention relates to a solar roof forming element for a roof of a building, and to a building having a roof at least partly formed by a plurality of such solar roof forming elements.

SUMMARY

It is an object of the invention to provide a roof forming element for efficiently forming a roof and having an easy-to-assemble solar integration. It is an object of the invention to further improve solar roof systems.

One or more of said objects are achieved by the solar roof forming element, combination, method, and building according to the present invention, the solar roof forming element, as defined in claim 1, being arranged for forming a solar roof of a building, which roof closes an opening of the building, wherein the roof is at least partly formed by a plurality of such roof forming elements which each close a part of said opening, the roof forming element comprising
an extruded, elongate polymer roof plate,
element coupling means for coupling the roof forming element to a further, neighbouring roof forming element of said plurality of roof forming elements extending in parallel to the roof forming element, so as to form a continuous coupling between the roof forming element and its neighbouring roof forming elements along both longitudinal sides of the roof forming element, in a longitudinal direction of the roof forming element, for closing at least a part of the opening in use,
at least one solar panel each having a plurality of photovoltaic cells, that means, solar cells, between a front layer and a back layer, the at least one solar panel covering the roof plate,
panel coupling means for coupling the at least one solar panel to the roof plate, comprising a first coupling part at a first of the longitudinal sides of the roof plate and a second coupling part at a first side of the solar panel, the first and second coupling parts being configured such that they couple with each other as a result of a movement of the solar panel relative to the roof plate, wherein in a coupled state of the first and second coupling parts a movement of the solar panel away from the roof plate in a direction perpendicular to the roof plate, that means in a direction perpendicular to the transverse and longitudinal direction of the roof plate and the solar roof forming element, is blocked.

An effect of the solar roof forming element according to the invention is that it may be very efficiently used for forming a roof of a building since the elongate roof plates may be directly mounted on an existing building, such as on an existing roof beam structure, which roof beam structure may be in the absence of covering material, so as to form the roof with a plurality of intercoupled such solar roof forming elements. The solar panel(s) and the roof plate of the solar roof forming elements can be intercoupled in a very easy manner at low manufacturing costs, due to the provision of the panel coupling means. Solar panels may be hooked or slid onto the roof plate, as it were, because of the first and second coupling parts.

The roof plate may be made of a material chosen from the group consisting of PP, PE, PC, PPO, ABS, ABS/PC, and the roof plate is preferably flame retardant, that means, it optionally comprises flame retardant additives. The use of PP is preferred. Preferably the roof plate is made of a polyolefin, preferably polypropylene or polyethylene, wherein further preferably the polymer is a reinforced polymer, preferably a glass fibre reinforced polymer, preferably glass fibre reinforced polypropylene, preferably PP-LGF.

The front layer of the solar panel, as well as a cover mentioned below, are light transparent. This means that they are light transparent to such an extent that in use of the solar panel electrical power is generated by the plurality of photovoltaic cells due to incident sunlight. For the purpose of the invention, with light transparent is meant that the front layer allows at least an average of 65%, preferably at least an average of 70%, more preferably at least an average of 75%, most preferably at least an average of 80% transmission of light in the wavelength range of 350 nm to 1200 nm as compared to a situation without front layer, when measuring the transmittance curves (full spectrum from 200-2500 nm) using a Perkin Elmer Lambda 950 according to ASTM D1003 (used lamp: halogen in combination with deuterium lamp). That means that the transmission of light is measured according to ASTM D1003. The same holds for the cover.

The roof plate preferably has a top plate on an upper side of the roof plate and a bottom plate on a lower side of the roof plate, which top and bottom plate are integrally interconnected via a plurality of ribs extending in a longitudinal direction of the roof forming element. Preferably, the roof plate is configured for mounting on a roof beam structure.

In an embodiment the first and second coupling parts may be configured such that they engage with each other as a result of a movement of the solar panel relative to the roof plate in a transverse direction of the roof forming element.

In an embodiment, the panel coupling means further comprise a third coupling part at a second longitudinal side opposite the first longitudinal side of the roof plate and a fourth coupling part at a second side of the solar panel opposite the first side of the solar panel, the third and fourth coupling parts being configured such that they couple with each other as a result of a movement of the solar panel relative to the roof plate, preferably as a result of a movement of the solar panel relative to the roof plate in the transverse direction, and in a coupled state of the third and fourth coupling parts a movement of the solar panel away from the roof plate in a direction perpendicular to the roof plate is blocked. This increases the easy and effective intercoupling of one or more such solar panels onto the roof plate of a solar roof forming element.

In an embodiment, the panel coupling means further comprising a fixation element blocking a transverse movement of the first coupling part relative to the second coupling part, in the coupled state of at least the first and second coupling parts, and preferably at the same time blocking a transverse movement of the third coupling part relative to the fourth coupling part, in their coupled state.

In an embodiment, the first coupling part of the panel coupling means comprise a first rib, provided on the upper side along one of the longitudinal sides of the roof plate, the first rib having a base part extending upwards from the upper side and a transversely extending part on a free end of the base part. Such a first rib may be efficiently extruded integral with the (remainder of the) roof plate. The second coupling part preferably comprises a second rib, provided on the back layer along a side of the solar panel, the second rib having a base part extending downwards from the back layer and a transversely extending part on a free end of the base part. The second rib may be an integral continuation of a combination of the back layer, or of a mutually bonded laminate of the front and back layer, beyond a solar portion having the plurality of solar cells. The first rib and the second rib may be configured such that the transversely extending part of the second rib may be moved between the upper side of the roof plate and the transversely extending part of the first rib, the transversely extending part of the first rib thereby being moved between the back layer and the transversely extending part of the second rib. This may be achieved by a movement of the solar panel relative to the roof plate in the transverse direction, or by sliding the second rib under the first rib in the longitudinal direction.

In an embodiment, the first rib is hook-shaped such that the first coupling part and the second coupling part are mutually coupled by the movement, preferably by a transverse movement including a tilting movement of the solar panel relative to the roof plate, and wherein the coupled state is blocked from being undone by a (subsequent) transverse translation of the solar panel relative to the roof plate. For the purpose of intercoupling the solar panel with the roof plate, the second coupling part may thus first be moved, in the transverse direction, to within the reach of the first coupling part, i.e. such that they may hook together, after which the solar panel may be tilted towards the roof plate, such that it subsequently rests on the roof plate, for example.

In an embodiment, wherein the roof plate, at the upper side and at the first longitudinal side, has a portion which is recessed, wherein the first rib is provided at the recessed portion and such that it does not extend upwards further than the recess, that means it does not extend further upwards than a plane defining an upper side of the roof plate, such as a plane through the top plate of the roof plate. This way a very easy and effective flush provision of solar panels of neighbouring solar roof forming elements of a combination of coupled roof forming elements may be provided, because the recessed portion of the roof plate provides room for the first and second coupling part.

In an embodiment, the panel coupling means further are configured such that in the coupled state, the solar panel extends parallel to at least a portion of the upper side of the roof plate, preferably rests on said portion of the upper side of the roof plate.

In an embodiment, the element coupling means comprise a first element coupling part on the upper side and along a first longitudinal side of the roof plate and a second element coupling part on the lower side and along a second opposite longitudinal side of the roof plate.

In an embodiment, the first element coupling part is integral with the first coupling part and is configured as a male coupling part, and wherein the second element coupling part is formed as a female coupling part, wherein a second element coupling part of a roof forming element still to be installed is configured to be coupled together with a first element coupling part of a roof forming element already installed on the building by a transverse movement and/or a tilting movement the roof forming element still to be installed relative to the already installed roof forming element. This manner of very effective coupling of solar roof forming elements resembles the manner of coupling of click laminate flooring.

In an embodiment, the first and second element coupling parts extend along the respective first and second longitudinal sides of the roof plate so as to form a continuous coupling between the roof forming element and its neighbouring roof forming elements along both longitudinal sides of the roof forming element in installed state.

In an embodiment, the solar roof forming element further comprises at least one cover, for covering the solar cells of a solar panel. In an embodiment, a cover may extend over more than one solar panel, or may cover a part of the solar cells of a solar panel.

The invention further relates to a combination of at least two solar roof forming elements according to the invention, wherein the solar panel or solar panels of each of the at least two solar roof forming elements are flush, and/or the roof plates of each of the at least two solar roof forming elements are flush.

The invention further relates to a building, having a solar roof, which roof closes an opening of the building, wherein the roof is at least partly formed by a plurality of roof forming elements according to any one of the preceding claims, which roof forming elements each close a part of said opening.

In an embodiment of the building, the roof has a roof beam structure distributed within the opening, wherein the plurality of roof forming elements is mounted on the roof beam structure so as to jointly close at least a part of said opening.

The invention also relates to a method of forming a roof of a building, using a plurality of solar roof forming elements according to the invention, the method comprising
  installing at least one said solar panel on the roof plate of each of the plurality of solar roof forming element, using the panel coupling means;
  transporting each said solar roof forming element to a building of which a roof is to be formed at least in part by said plurality of solar roof forming elements;
  installing a first of the plurality of solar roof forming elements so that it covers a part of an opening of the building;
  installing further of the plurality of solar roof forming elements, each time coupling a roof forming element to be installed with an installed of said plurality of solar roof forming elements using the element coupling means.

Embodiments and effects of the solar roof forming element as described above and below are applicable in an analogous manner to the combination, building and method according to the invention, and vice versa.

BRIEF DESCRIPTION OF DRAWINGS

The present teachings are described hereinafter with reference to the accompanying schematic drawings in which examples of the invention are shown and in which like reference numbers indicate the same or similar elements.

FIG. 5 shows a cross-section of the roof plate of FIG. 2;

FIG. 6 shows, in cross-section, three intercoupled (parts of) roof plates as shown individually in FIG. 5;

FIG. 7 gives an impression of the manner of intercoupling two roof plates as shown in coupled state in FIG. 6;

FIG. 8 shows, in cross-section, the roof plate of FIG. 2 and the solar panel of FIG. 3 in coupled state;

FIG. 9 shows a part of an embodiment of a solar roof forming element according to the present invention;

DESCRIPTION OF EMBODIMENTS

Figure 1:
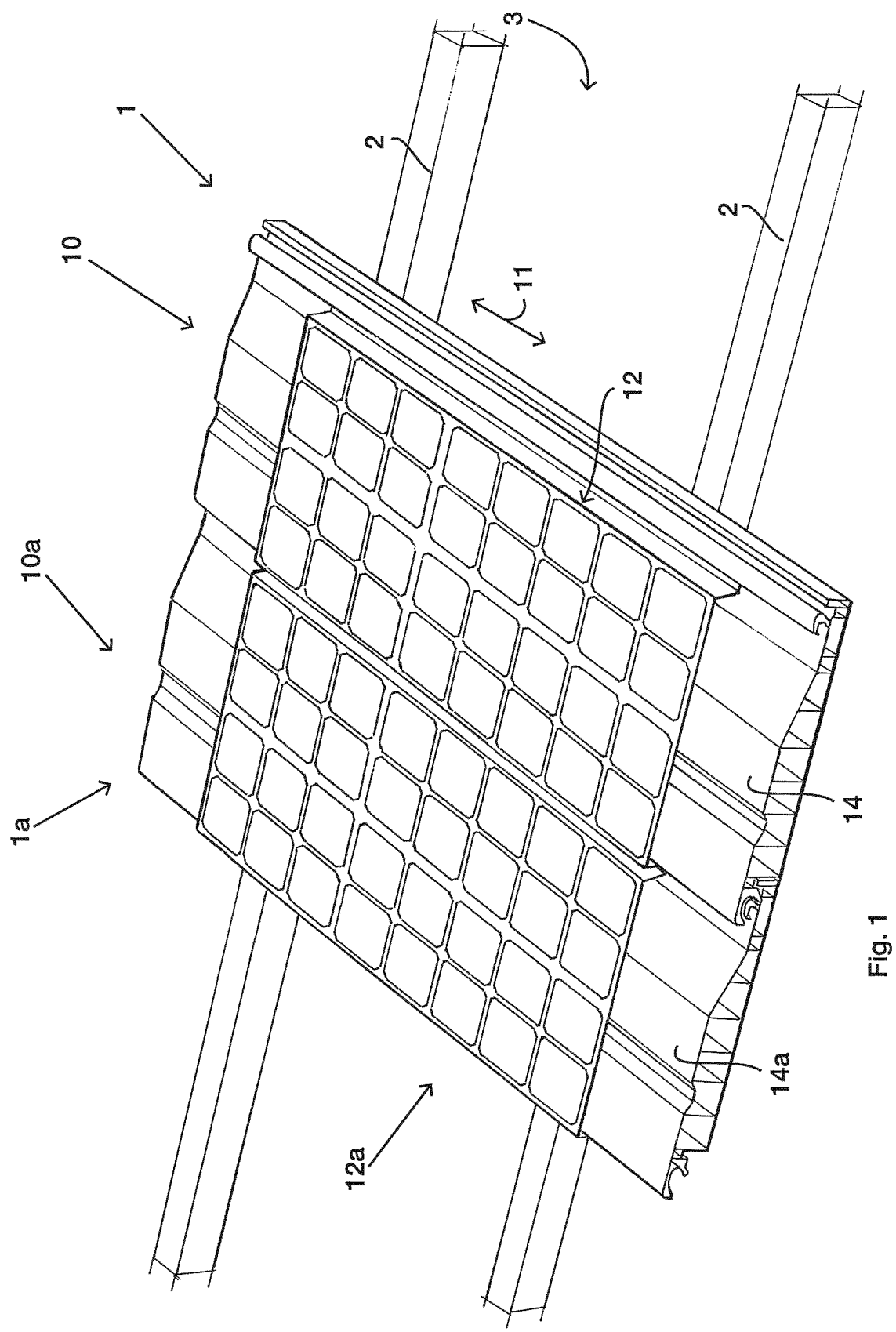
FIG. 1 shows in 3-dimensional view a combination of at least a part of two solar roof panel elements according to an embodiment of the present invention, in installed condition on roof beams of a building.
Figure 2:
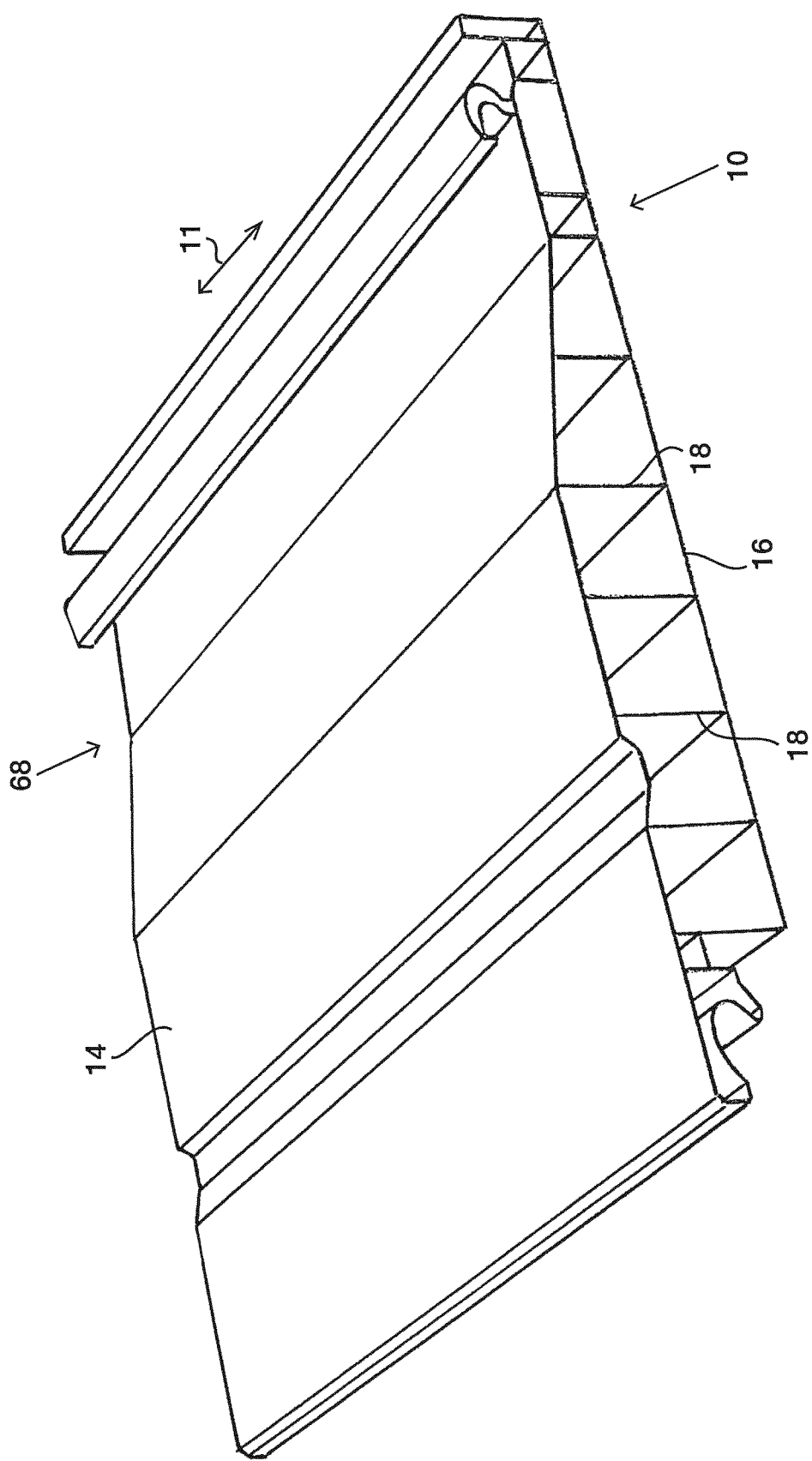
FIG. 2 shows in 3-dimensional view at least a part of a roof plate of the solar roof panel element of FIG. 1.
Figure 10:
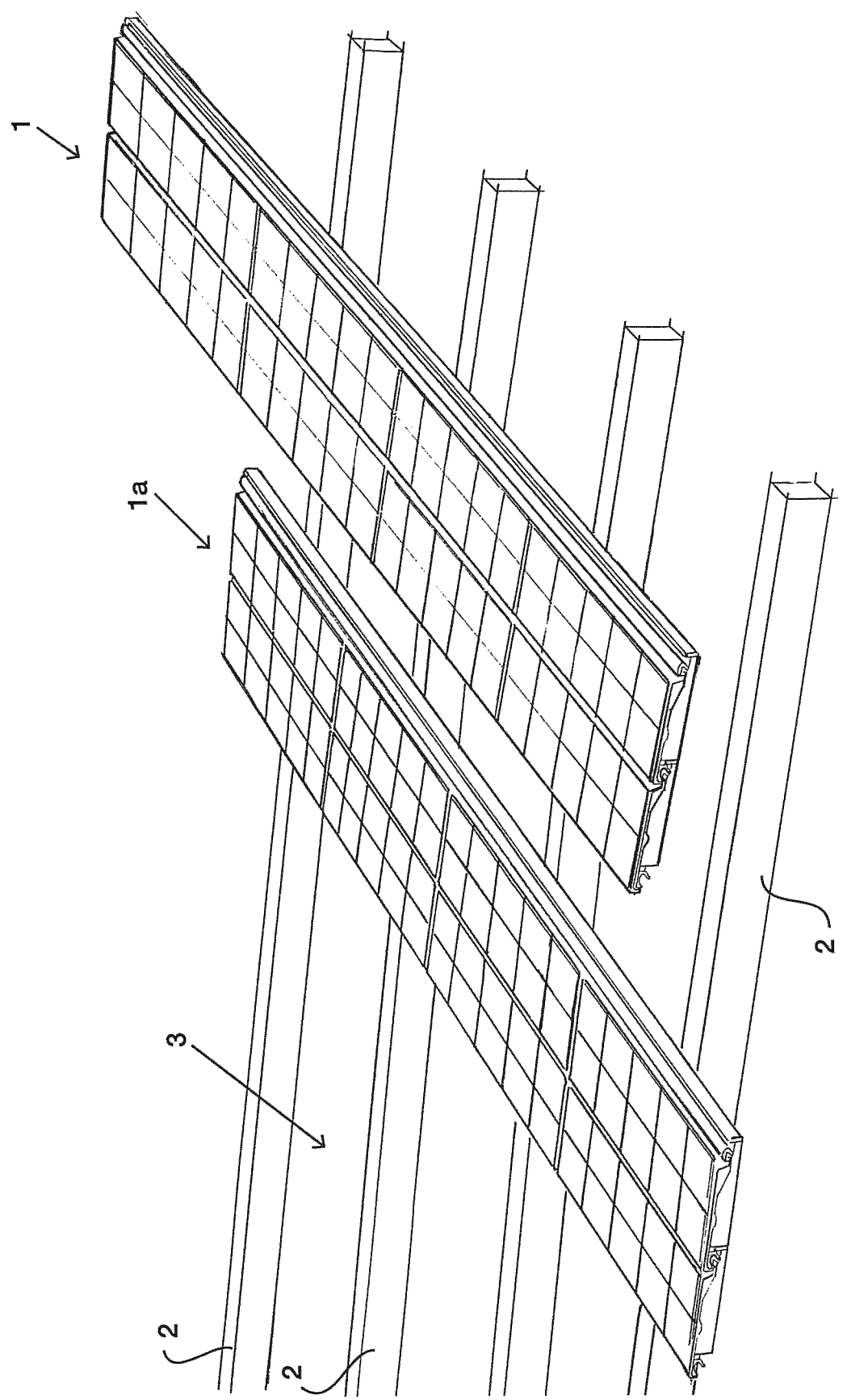
FIG. 10 shows one installed, and one to be installed, embodiment of a solar roof forming element according to the present invention, onto a partly shown roof beam structure of a building.
Figure 11:
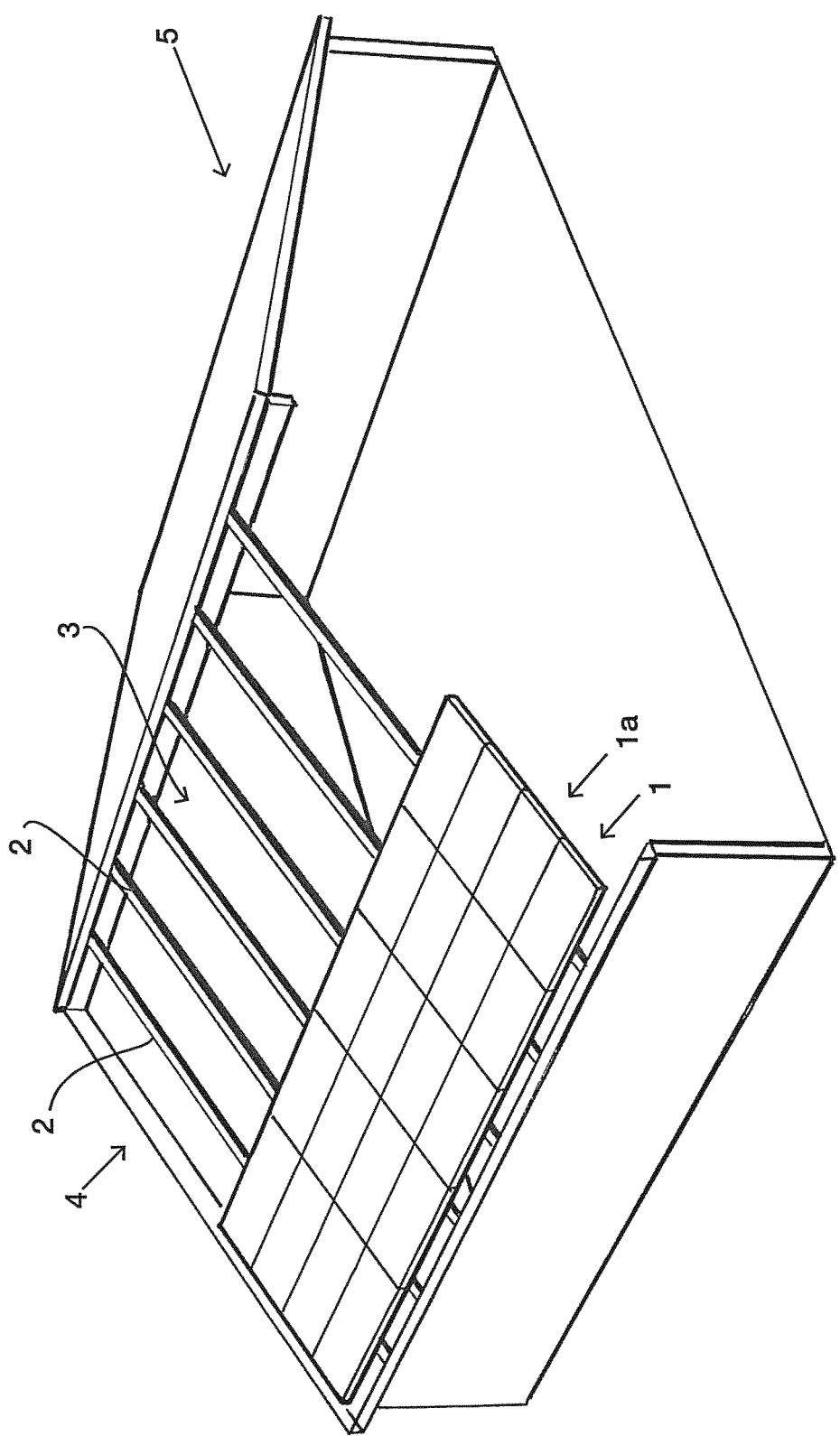
FIG. 11 shows a building having a partially installed roof formed by a plurality of embodiments of solar roof forming elements according to the present invention.

FIG. 1 shows a combination of—at least parts of—two solar roof forming elements 1 according to the present invention, in installed state on roof beams 2. The roof beams are part of a roof beam structure provided in an opening of a building. See also FIGS. 10 and 11. Said FIGS. 10 and 11 show an example of a building 5 having a roof beam structure 4 provided in an opening 3 of the building 5, wherein the roof beam structure 4 has a plurality of roof beams 2, in the example of FIG. 11 being rafters extending mutually parallel and in the height direction, that means towards the roof ridge, wherein the roof may be formed by solar roof forming elements according to the present invention extending in the width direction of the roof, that is, between side walls of the building (one of the side walls, the right-side wall in the view of FIG. 11, not shown in FIG. 11), and being installed directly onto the rafters. In another case the roof beam structure may have purlins extending over the span of the opening in a width direction of the building. In such a case, solar roof forming elements 1, 1a of the invention may be installed extending in a height direction of the roof, that is, from a (front) building wall towards the ridge of the roof to be formed and being installed directly onto the roof beams 2 in the form of purlins. The building roof is be formed by closing the opening of the building by installing a plurality of such roof forming elements 1 onto the roof beam structure. Thus, each element 1 closes a part of said opening 3 of the building 5. Fixation means such as screws 72 may be provided for the purpose of fixating the solar roof forming elements 1 to the roof beam structure underneath. See FIG. 9 for an example of how such screws may be used, in combination with short-length steel strips 74 for additional strength and reduction of the chance of damage to the roof plates 10.

Figure 4:
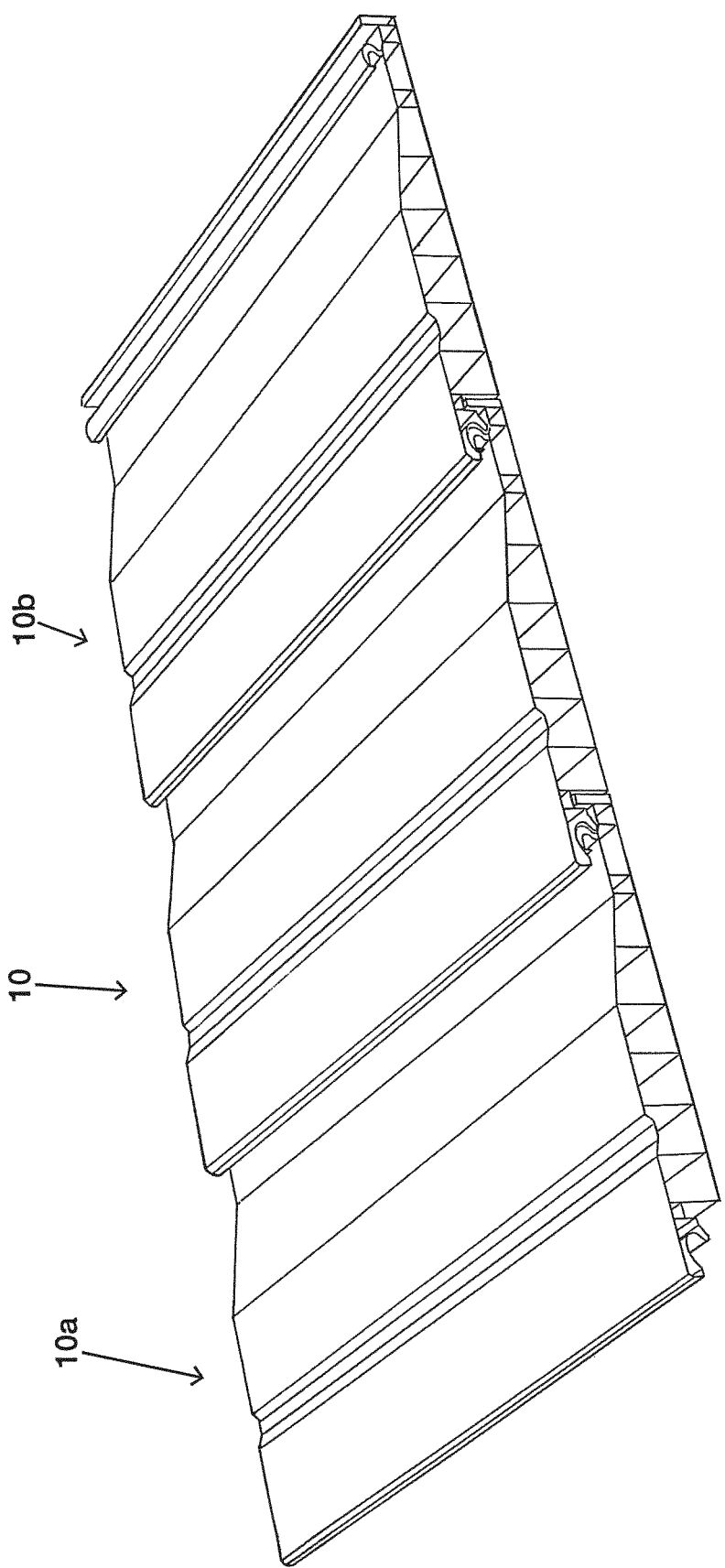
FIG. 4 shows in 3-dimensional view a combination of three intercoupled (parts of) roof plates as shown individually in FIG. 2.

The solar roof forming element 1 comprises an extruded, elongate polymer roof plate 10 of polypropylene having a top plate 14 on an upper side of the roof plate 10 and a bottom plate 16 on a lower side of the roof plate 10, which top and bottom plate 14, 16 are integrally interconnected via a plurality of ribs 18 extending in a longitudinal direction 11 of the roof forming element 1. See FIGS. 2 and 4-7. FIG. 6 shows a part of two roof plates 10, 10a, of two respective solar roof forming elements, in coupled state while FIG. 4 shows three such roof plates 10, 10a, 10b. Any suffix a and b as used throughout the present description is only used to distinguish individual solar roof forming elements or components thereof such as roof plates or solar panels when their interrelation is discussed. The roof forming elements 1, 1a and their components such as roof plates 10, 10a and solar panels 12, 12a are identical, at least in the examples shown in the figures.

The solar roof forming element 1 has element coupling means for coupling the roof forming element 1 to a further, neighbouring roof forming element 1a of said plurality of roof forming elements which extends in parallel—in the length direction—to the roof forming element 1, so as to form a continuous coupling between the roof forming element 1 and its neighbouring roof forming elements 1a along both longitudinal sides of the roof forming element 1, in the longitudinal direction 11 of the roof forming element 1, for closing at least a part of the opening 3 in use.

The solar roof forming element 1 further has at least one solar panel 12 each having a plurality of photovoltaic cells 20 on a solar portion 21 of the solar panel 12 and between a front layer 22 and a back layer 24 (layers 22 and 24 not shown in further detail) of the solar panel 12. In the example shown in the figures, the solar portion 21 is flat. As FIG. 1 shows, the at least one solar panel 12, 12a covers the top plate 14, 14a of the roof plate 10, 10a. In an embodiment, the solar roof forming element may have a plurality of solar panels each extending over a width of the roof forming element, in a transverse direction 36, and along a part of a length of the roof forming element, i.e. in the longitudinal direction. In an example, the roof plate may have a length of several meters, such as five meters, for example, onto which five solar panels each of about one meter are provided, for example.

The solar panel 12 may be a laminate having a front and a back layer of a polyolefin, such as of polypropylene, for example, wherein the plurality of photovoltaic cells 20 are encapsulated by an encapsulant material. The front and the back layers 22, 24 may be directly bonded to each other outside the solar portion 21, that is, at a second coupling part 32 and a fourth coupling part 42 to be described below. The material of the front and/or back layers 22, 24 may form said coupling parts 32, 42 integral with the solar portion 21 of the solar panel 12.

The roof forming element 1 has panel coupling means 26 for coupling the at least one solar panel 12 to the roof plate 10 (see FIG. 8). The panel coupling means comprise first coupling part 28 in the form of a first rib along a first 30 of the longitudinal sides of the roof plate 10, which also is a first longitudinal side of the roof forming element 1, and a second coupling part 32 in the form of a second rib along a first side 34 of the solar panel 12, the first and second coupling parts 28, 32 being configured such that they engage with each other as a result of a movement of the solar panel 12 relative to the roof plate 10 in a transverse direction 36 of the roof forming element 1. In a coupled state of the first and second coupling parts 28, 32 a movement of the solar panel 12 away from the roof plate 10 in a direction 38 perpendicular to the roof plate 14 is blocked, that means, upwards in the view of FIG. 8.

The panel coupling means 26 further comprise a third coupling part 40 in the form of a ridge along a second longitudinal side 44, also defining a second longitudinal side of the roof forming element 1, opposite the first longitudinal side 30 of the roof plate 10 and a fourth coupling part 42 in the form of a rib along a second side 46 of the solar panel 12 opposite the first side 34 of the solar panel 12, the third and fourth coupling parts 40, 42 being configured such that they engage with each other as a result of a movement of the solar panel 12 relative to the roof plate 10 in the transverse direction 36. In a coupled state of the third and fourth coupling parts 40, 42, the rib, with a transversely extending portion 48 on a free end of a base portion 50 extending backwards, i.e. to the side opposite the solar cells 20, from the back layer 16, or, from the solar portion 21 of the solar panel 20, and perpendicular to the back layer 16, engages behind the ridge. As a result, a movement of the solar panel 12 away from the roof plate 10 in a direction perpendicular to the roof plate 14, that means, upwards in the view of FIG. 8, is blocked.

In an alternative embodiment the second and fourth coupling parts of the solar panel may be separate components, fixated to the solar portion of the solar panel. For example, the second and fourth coupling parts may be formed by several steel strips extending in the transverse direction underneath the solar portion. This way, the second coupling part comprises several individual hook-shaped parts, defining the second coupling part, along the solar panel in the longitudinal direction. The same holds for the fourth coupling part.

Figure 3:
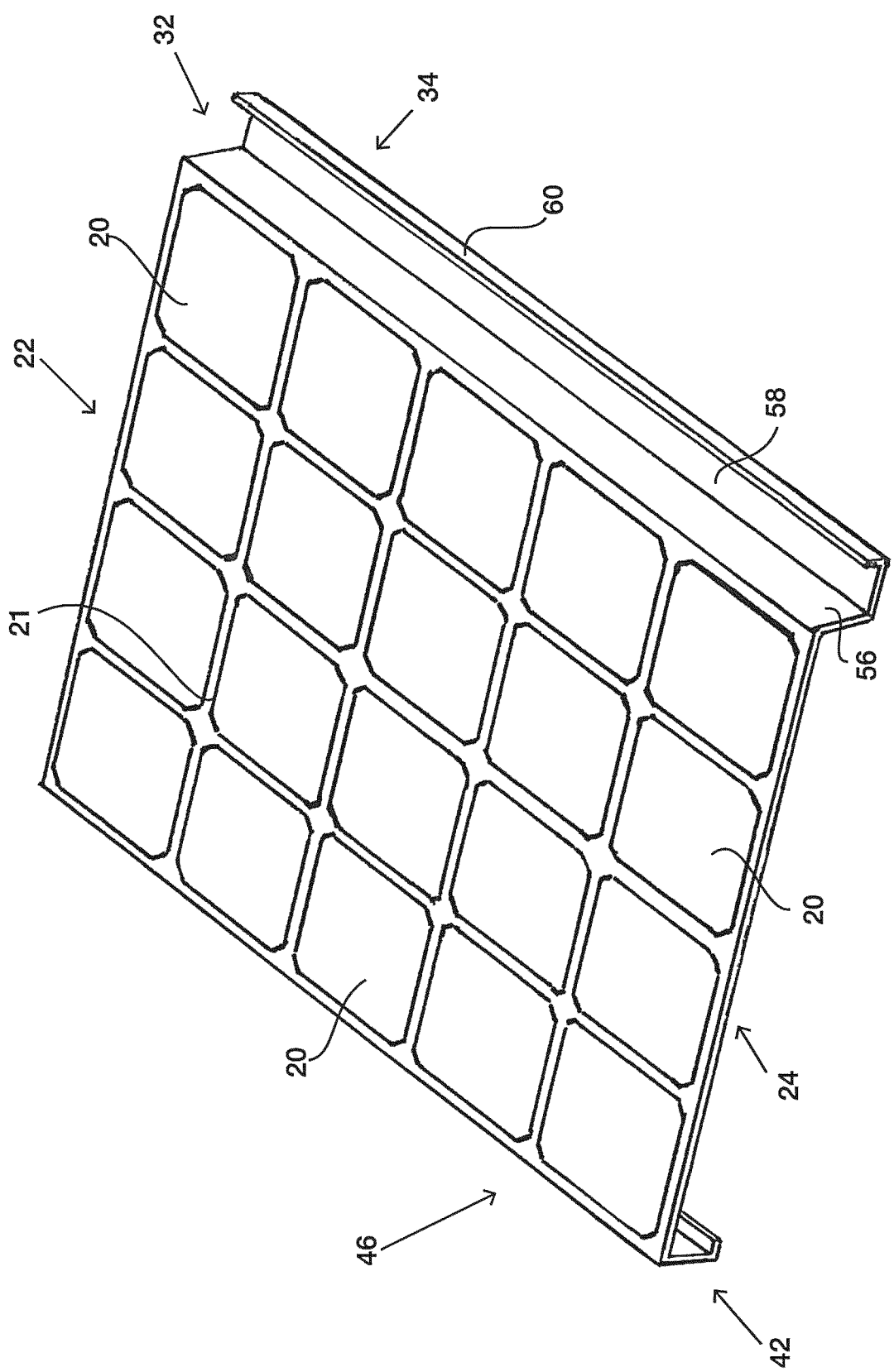
FIG. 3 shows in 3-dimensional view a solar panel of the solar roof panel element of FIG. 1.

The first coupling part 28 in the form of the first rib, provided on the upper side of the roof plate 10 along one of the longitudinal sides 30 of the roof plate, has a base part 50 extending upwards from the upper side, that means from the top plate 14 and has a transversely extending part 52 on a free end of the base part 50. Finally, it has a downwards extending edge 54 on the free end of the part 52. This way, the first rib is in the form of a hook, or, question-mark, as FIG. 5 shows in particular. The second coupling part 32 in the form of the second rib, extending backwards from the back layer 16, i.e. from the flat solar portion 21, and along the side 34 of the solar panel 12, likewise has a base part 56 extending downwards, that means, backwards from the back layer 24 and has a transversely extending part 58 on a free end of the base part, and finally an upwards directed edge 60 on a free end of the part 58. This way, the rib is also, generally, in the form of a hook, or, (upside down) question-mark, as FIGS. 3 and 8 show in particular. The first coupling part 28 and the second coupling part 32 are configured such that the transversely extending part 58 of the second coupling part 32 may be moved between the top plate 14 of the roof plate and the transversely extending part 52 of the first coupling part, the transversely extending part 52 of the first coupling part 28 thereby being moved between the back layer 24 and the transversely extending part 58 of the second coupling part.

More in particular, because of the hook-shaped configuration of the first and second ribs they are mutually coupled by the transverse movement, including a tilting movement of the solar panel 12 relative to the roof plate 10. This means that for the purpose of coupling the solar panel 12 to the roof plate 10, first the second coupling part 32 in the form of the second rib needs to be brought under the first coupling part 28 in the form of the first rib 28 by a transverse movement, to the right in the view of FIG. 8, while the opposite side 46 of the solar panel 12 is still at a distance from the roof plate 10. This means that generally the solar panel 12 and the roof plate 10 enclose a sharp angle. Then, the solar panel 12 is tilted downwards until the solar portion 21, more specifically the back layer 24, rests on the top layer 14 of the roof plate 10 as FIG. 8 shows. The rib 42 of the solar panel 12 is then still free from the ridge 40 of the roof plate 10. By a subsequent slight transverse movement, again to the right in FIG. 8, the rib 42 hooks behind the ridge 40 with its transversely extending portion 48. The coupled state is blocked from being undone by a transverse translation of the solar panel 12 relative to the roof plate 10 That means, a sliding movement of the solar panel 12 along the roof plate 10, to the left in FIG. 8, cannot undo the coupled state realised by the ridges 28 and 32 because the edges 54 and 60 then still are hooked behind one another as FIG. 8 shows. Further, the mentioned subsequent slight transverse movement creates a space in between these edges 54 and 60. A fixation element is provided, in the form of a clamp 62, filling this space and blocking a transverse movement (translation) of the rib 28 relative to the rib 32, in the coupled state of the ribs 28 and 32 as well as of the rib 42 and ridge 40. This way, the solar panel 12 is positively blocked from any movement relative to the roof plate 10 except for a translation in the longitudinal direction 11. This remaining movement can easily and effectively be blocked, if necessary at all, such as by a screw 64 through the solar panel 12, at a predetermined location in between solar cells 20, into the roof plate 10. See FIG. 9. Instead of the use of separate fixation clamps 62, parts of the panel coupling means, such as parts of, or the entire second coupling part 32 and/or parts of, or the entire fourth coupling part 42, may be flexible wherein the panel coupling means may be configured for allowing a snap-connection such as between the third and fourth coupling parts so as to block transverse movement of the solar panel relative to the roof plate after coupling of the solar panel with the roof plate. In an embodiment, the first and second coupling part may be designed so as to block a movement of the solar panel 12 relative to the roof plate 10 in the transverse direction, in the coupled state.

The panel coupling means 26 are further being configured such that in the coupled state as described above, the solar panel 12 extends parallel to the top plate 14, that means, at least to a portion thereof, and also rests on the top plate 14, or at least on said portion of the top plate 14. For damping any small relative movements (flappering/vibrating) of the solar panel 12 and/or roof plate 10 relative to each other, a damping layer such as including a foamed material may be provided in between the solar panel 12 and the roof plate 10. Alternatively a gap may be present between the solar panel 12 and the roof plate 10 along a part of or the entire (solar) portion between the panel coupling means along both opposite sides 34, 46 of the solar panel 12.

For the purpose of letting the solar panel 12 rest on the roof plate 10, the roof plate, at the upper side and at the first longitudinal side 30, has a portion 68 which is recessed with respect to the plane of a remaining portion of the top plate 14 onto which the solar panel rests, wherein the first rib 28 is provided at the recessed portion 68 and such that it does not extend upwards further than the plane of that remaining portion of the top plate 14 as FIG. 5 shows by the dashed line.

The solar roof forming element 1 may further have a cover 76 for at least covering the solar cells 20 provided on each of the solar panels 20. The cover 76 may be formed such as to provide an aesthetic appearance or to resemble a pattern of roof tiles, for example. The cover 76 may be fixated with screws, for example, to the solar panel 12.

As mentioned above, the solar roof forming element 1 also has element coupling means for coupling the roof forming element 1 to a further, neighbouring roof forming element 1a of said plurality of roof forming elements. The element coupling means comprise a first element coupling part on the upper side and along the first longitudinal side 30 of the roof plate 10 and a second element coupling part on the lower side and along the second opposite longitudinal side 44 of the roof plate. In the examples as shown in the figures, the first element coupling part is integral with the first coupling part 28 and is configured as a male coupling part. Basically, the rib 28 is configured for coupling the roof plate 10 to a solar panel 12 on the inside of the hook-shape, and for coupling the roof plate 10 to a further roof plate 10a on the outside of the roof shape, as FIGS. 6, 7 and 8 show in particular. The second element coupling part 70 is formed as a female coupling part, wherein a second element coupling part of a roof forming element still to be installed, such as element 1 in FIG. 10, is configured to be coupled together with a first element coupling part of a roof forming element 1a already installed on the building by a tilting movement the roof forming element still to be installed 1 relative to the already installed roof forming element 1a. See also FIG. 7. The principle of coupling of the elements 1, 1a is similar to the general principle of coupling of click laminate flooring. The first and second element coupling parts 28, 70 extend along the respective first and second longitudinal sides of the roof plate so as to form a continuous coupling between the roof forming element and its neighbouring roof forming elements along both longitudinal sides of the roof forming element in installed state. Sealing element, such as longitudinally extending seal strips, may be provided to further close off the roof as formed from environmental influences such as precipitation. Such sealing elements may for example be provided between the first and second element coupling means 28, 70. The coupling of roof forming elements 1 as described above may, on a roof, be performed manually or (semi) automated.

The invention claimed is:

1. A solar roof forming element for forming a solar roof of a building, which solar roof closes an opening of the building, wherein the solar roof is at least partly formed by a plurality of the roof forming elements, each of which closes a part of said opening,
the roof forming element comprising
an extruded, elongate polymer roof plate,
element coupling means for coupling the roof forming element to a further, neighbouring roof forming element of said plurality of roof forming elements extending in parallel to the roof forming element, so as to form a continuous coupling between the roof forming element and its neighbouring roof forming elements along both longitudinal sides of the roof forming element, in a longitudinal direction of the roof forming element, for closing at least a part of the opening in use,
at least one solar panel each having a plurality of photovoltaic cells between a front layer and a back layer, the at least one solar panel covering the roof plate,
panel coupling means for coupling the at least one solar panel to the roof plate, comprising a first coupling part at a first of the longitudinal sides of the roof plate and a second coupling part at a first side of the solar panel, the first and second coupling parts being configured such that they couple with each other as a result of a movement of the solar panel relative to the roof plate, wherein in a coupled state of the first and second coupling parts a movement of the solar panel away from the roof plate in a direction perpendicular to the roof plate is blocked,
wherein the first coupling part of the panel coupling means comprises a first rib which has been extruded integral with the roof plate, provided on an upper side along one of the longitudinal sides of the roof plate, the first rib having a base part extending upwards from the upper side and a transversely extending part on a free end of the base part,
the second coupling part comprises a second rib, provided on the back layer along a side of the solar panel, the second rib having a base part extending downwards from the back layer and a transversely extending part on a free end of the base part,
wherein the first rib is hook-shaped, the hook-shape being configured such that in use the first coupling part and the second coupling part are mutually coupled by the movement being a transverse movement including a tilting movement of the solar panel relative to the roof plate, and wherein the coupled state is blocked from being undone by a transverse translation of the solar panel relative to the roof plate,
and wherein the roof plate, at the upper side and at the first longitudinal side, has a portion which is recessed, wherein the first rib is provided at the recessed portion and such that it does not extend upwards further than the recess.

2. The solar roof panel element according to claim 1, the panel coupling means further comprising a third coupling part at a second longitudinal side opposite the first longitudinal side of the roof plate and a fourth coupling part at a second side of the solar panel opposite the first side of the solar panel, the third and fourth coupling parts being configured such that they couple with each other as a result of a movement of the solar panel relative to the roof plate, and in a coupled state of the third and fourth coupling parts a movement of the solar panel away from the roof plate in a direction perpendicular to the roof plate is blocked.

3. The solar roof panel element according to claim 1, the panel coupling means further comprising a fixation element blocking a transverse movement of the first coupling part relative to the second coupling part, in the coupled state of at least the first and second coupling parts.

4. The solar roof forming element according to claim 1, the first rib and the second rib being configured such that the transversely extending part of the second rib may be moved between the upper side of the roof plate and the transversely extending part of the first rib, the transversely extending part of the first rib thereby being moved between the back layer and the transversely extending part of the second rib.

5. The solar roof forming element according to claim 1, the panel coupling means further being configured such that in the coupled state, the solar panel extends parallel to at least a portion of the upper side of the roof plate.

6. The solar roof forming element according to claim 1, wherein the element coupling means comprise
a first element coupling part on the upper side and along a first longitudinal side of the roof plate and a second element coupling part on the lower side and along a second opposite longitudinal side of the roof plate.

7. The solar roof forming element according to claim 6, wherein the first element coupling part is integral with the first coupling part and is configured as a male coupling part, and wherein the second element coupling part is formed as a female coupling part, wherein a second element coupling part of a roof forming element still to be installed is configured to be coupled together with a first element coupling part of a roof forming element already installed on the building by a tilting movement the roof forming element still to be installed relative to the already installed roof forming element.

8. The solar roof forming element according to claim 6, wherein the first and second element coupling parts extend along the respective first and second longitudinal sides of the roof plate so as to form a continuous coupling between the roof forming element and its neighbouring roof forming elements along both longitudinal sides of the roof forming element in installed state.

9. The solar roof forming element according to claim 1, further comprising at least one cover for at least substantially completely covering the solar cells of a solar panel.

10. A combination of at least two solar roof forming elements according to claim 1, wherein the solar panel or solar panels of each of the at least two solar roof forming elements are flush, and/or the roof plates of each of the at least two solar roof forming elements are flush.

11. A building, having a solar roof, which roof closes an opening of the building, wherein the roof is at least partly formed by a plurality of roof forming elements according to claim 1, wherein the roof forming elements each closes a part of said opening.

12. The building according to claim 11, the roof having a roof beam structure distributed within the opening, wherein the plurality of roof forming elements is mounted on the roof beam structure so as to jointly close at least a part of said opening.

13. A method of forming a roof of a building, using a plurality of solar roof forming elements according to claim 1, the method comprising installing at least one said solar panel on the roof plate of each of the plurality of solar roof forming element, using the panel coupling means;

transporting each said solar roof forming element to a building of which a roof is to be formed at least in part by said plurality of solar roof forming elements;

installing a first of the plurality of solar roof forming elements so that it covers a part of an opening of the building;

installing further of the plurality of solar roof forming elements, each time coupling a roof forming element to be installed with an installed of said plurality of solar roof forming elements using the element coupling means.

14. The solar roof forming element according to claim 1, wherein the first coupling part and the second coupling part are mutually coupled by a transverse movement including a tilting movement of the solar panel relative to the roof plate.

15. The solar roof forming element according to claim 1, the panel coupling means further being configured such that in the coupled state, the solar panel extends parallel to at least a portion of the upper side of the roof plate and resting on said portion of the upper side of the roof plate.

16. The building according to claim 11, wherein the solar panels of each of the plurality of solar roof forming elements are flush, and/or the roof plates of each of the plurality of solar roof forming elements are flush.

* * * * *